Feb. 17, 1931.  R. G. COWLISHAW  1,792,895
PNEUMATIC BRAKE FOR RAILROAD VEHICLES
Filed July 16, 1928  2 Sheets-Sheet 2
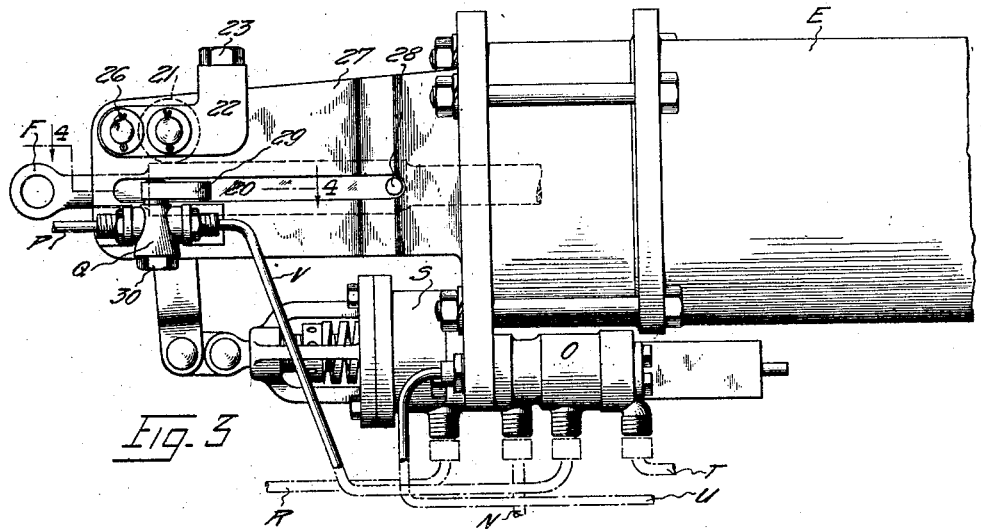
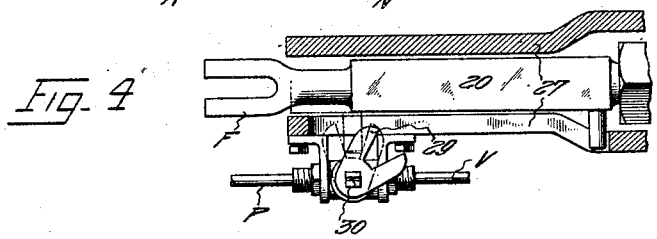
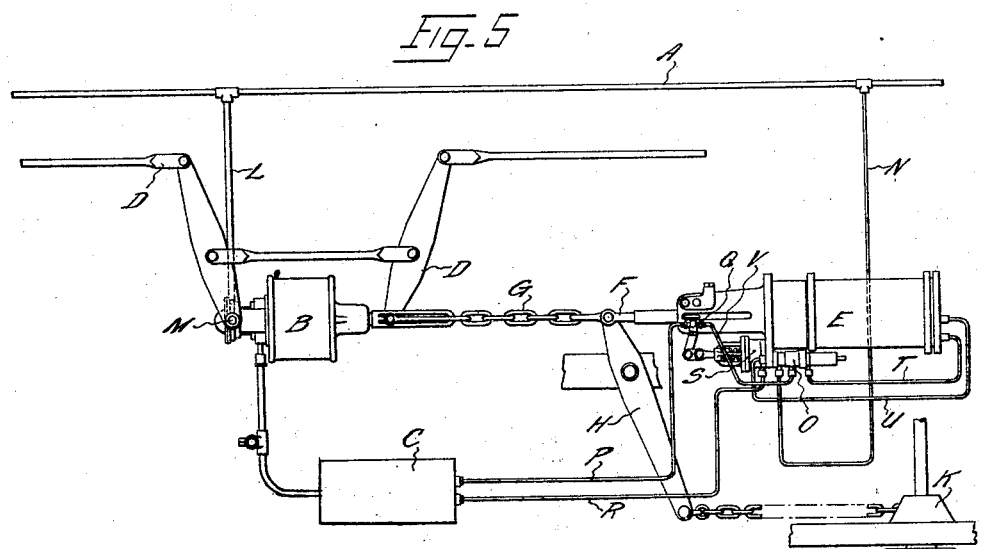
R. G. Cowlishaw
INVENTOR
By: Marks & Clerk Patented Feb. 17, 1931

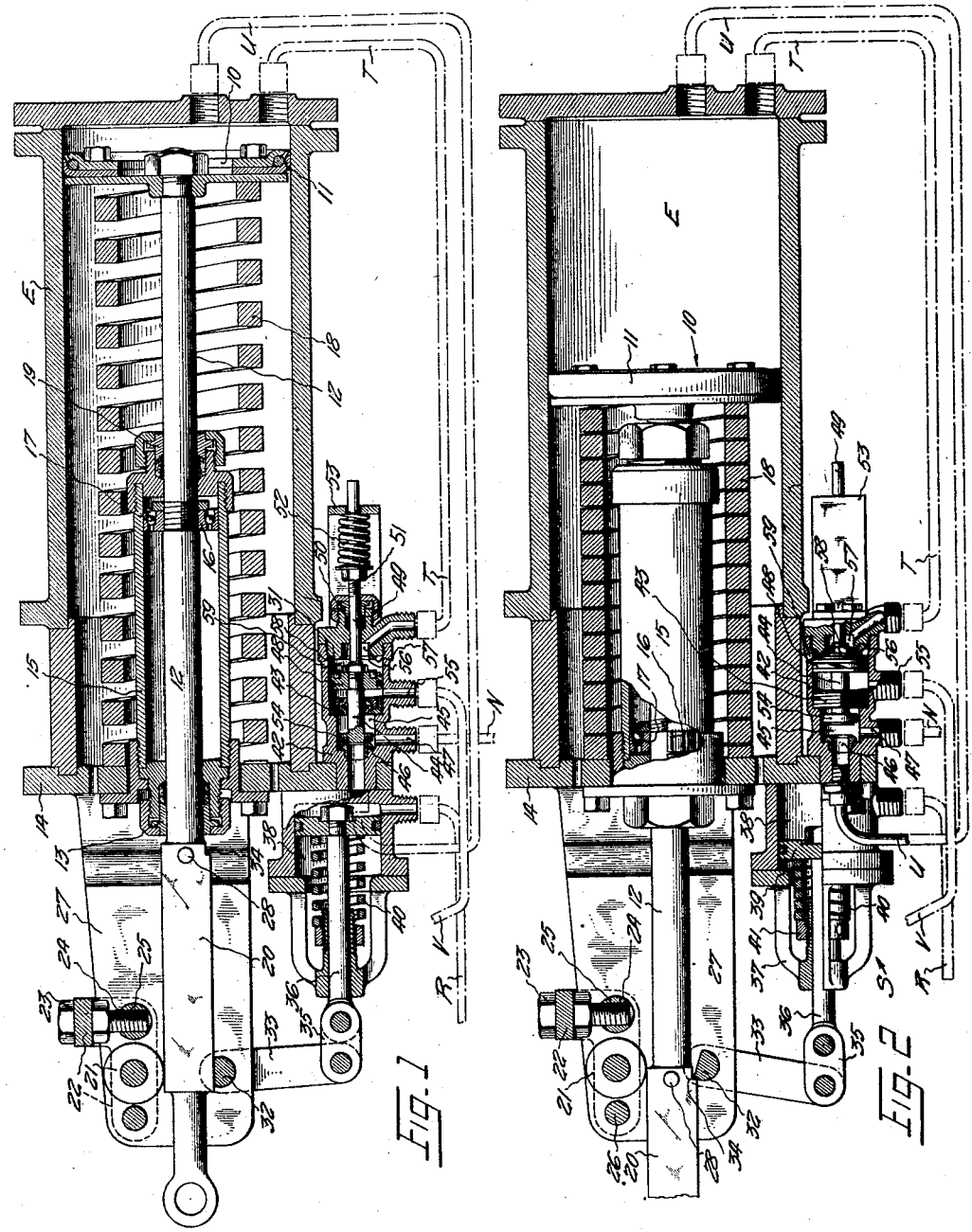

1,792,895

UNITED STATES PATENT OFFICE

ROY GRATTAN COWLISHAW, OF MANLY, NEAR SYDNEY, NEW SOUTH WALES, AUSTRALIA, ASSIGNOR TO HAROLD BAILEY, OF HOMEBUSH, NEAR SYDNEY, NEW SOUTH WALES, AUSTRALIA

PNEUMATIC BRAKE FOR RAILROAD VEHICLES

Application filed July 16, 1928, Serial No. 293,093, and in Australia July 30, 1927.

This invention relates to an accessory or emergency brake for supplementing the standard air pressure brake equipment commonly used in railway and tramway vehicles.

The office of this accessory equipment is to apply the brakes by means of a spring when the standard brake equipment becomes ineffective on account of drop of pressure of air in the auxiliary air reservoir in the vehicle and in the train pipe. It has its utility not only as an emergency brake in running service to take up the work of the standard air pressure brake equipment in case of air failure, but also to ensure the safety of standing cars, and to ensure safe conditions during shunting. It provides means for permitting recharging of the auxiliary air reservoir whilst the accessory brake is applied without meantime releasing the accessory brake, and also means for releasing the accessory brake when normal operative conditions are restored in the standard brake equipment.

The accessory brake comes into operation automatically when the air pressure in the auxiliary air reservoir falls below a pre-arranged limit point, and is released and reset for repeat operation automatically when the air pressure in the auxiliary air reservoir is restored above the low limit point. The arrangement therefore functions so that operation of the regular brake equipment is not affected but takes place in the ordinary way and without any interference; but when the ordinary brake equipment becomes inoperative by reason of air failure, then the accessory brake comes automatically into action and remains operative until normal conditions are restored in the regular brake system, and is then reset automatically for re-operation when air failure occurs again.

In each vehicle to be braked a cylinder is fitted additionally to the standard air pressure brake equipment; said cylinder is fitted with a piston or plunger and it is connected by pipes to the pressure air system of the standard brake. Movement of the piston obediently to train pipe air pressure acting against it compresses a helical spring. The reaction of that spring is competent for applying an effective pull or pressure on the brake linkage of the vehicle to slow up and stop the vehicle and to hold the vehicle whilst air pressure no longer operates to hold the spring compressed. When the spring is fully compressed and the piston therefore moved to the full inward position, a spring closed latch engages a rod through which the spring operates the standard brake linkage; this latch prevents the spring from extending to apply the brakes so long as normal air pressure is maintained in the auxiliary air cylinder of the standard brake equipment. The latch releases the spring when the air pressure fails in the auxiliary reservoir; and the spring then operates the brake linkage and applies the brakes. The latch is engaged by a connection from a piston which is moved by the auxiliary air pressure, and it is disengaged by reverse movement of said piston effected by a spring when the auxiliary air pressure fails. The latch retains the accessory brake operating rod at its released position and holds the brake spring fully compressed whilst it is engaged. Immediately, however, the auxiliary reservoir air pressure fails, the latch is withdrawn and the brakes are applied. When normal air pressure conditions are restored in the auxiliary cylinder, the brake is released automatically and the brake spring is recompressed and the latch is set and remains ready for release again if and when the pressure again fails. A manual pull-off device is provided to facilitate handling of the vehicle when it is detached from the engine from which the brake air service is supplied.

In the accompanying drawings:—

Fig. 1 is a longitudinal sectional elevation through the apparatus with the brake spring extended and with the automatic valve at the release position and the latch position retired and the latch free;

Fig. 2 is a similar view showing the same parts in the position in which they appear when the brake spring is compressed and the automatic valve is at the position which it takes up during the advance movement of the piston and the closing of the brake spring and the engageemnt of the latch;

Fig. 3 is a side elevation corresponding with Fig. 1, portion of the accessory brake cylinder being shown broken away;

Fig. 4 is a fragmentary elevational view explanatory of the operation of a cut-off valve which is contained in the pipe lead from the auxiliary air reservoir to the cylinder in the automatic valve; and Fig. 5 is a general arrangement explanatory of the fitting of the apparatus in connection with a standard air brake equipment.

Referring to Fig. 5: A is the train pipe which extends through the vehicle and is connected serially with the train pipes in other vehicles in a train to supply air at train pipe pressure to all the vehicles. B is the standard equipment brake cylinder, C the auxiliary air reservoir, D brake rigging, E the accessory brake cylinder, F the pull-and-push rod of the accessory brake equipment, G chain or like connection between the rod F and the standard brake linkage D, H release lever for the accessory brake, K manual pull-off device operating through the lever H to compress the accessory brake spring thus to release the accessory brake and free the vehicle wheels for shunting or like purposes whilst it is detached from the train. L is a pipe connecting the train pipe A to the triple valve M which is associated with the standard brake cylinder B, N a pipe connecting the train pipe A to an inlet port in the automatic valve O, P a pipe connecting the auxiliary air reservoir C through an automatic cock Q to the cylinder in the automatic valve O, R a pipe connecting the auxiliary air reservoir C with the latch control cylinder S, T an air release pipe connecting the back end of the accessory brake cylinder E with a chamber in the back end of the automatic valve O, and U is a pipe connecting the back end of the accessory brake cylinder E with the high pressure charging port in the automatic valve O.

The structural detail and the system of connection of the standard brake equipment will not be described in detail, as they are already well understood. The brake beam or brake linkage is connected at some convenient point through a chain or like member G to the accessory brake and the accessory brake does not interfere with the normal action of the standard brake. It supplements it and operates in substitution for it only when the air pressure fails.

The accessory brake cylinder E is fitted with a piston 10 having a bucket leather or like packing ring 11. The piston rod 12 extends through a stuffing box 13 which is fitted in the front cover 14 of the cylinder E. An effective mounting for the stuffing box 13, forming also a carrier for a dash pot cylinder 15 is shown in the drawings, but this detail does not form an essential part of the invention. A piston or plunger 16 working in the dash pot cylinder 15 is fitted on the rod 12; this piston or plunger is fitted with one-way valves 17 which permit of a rapid outward movement of the rod 12 when the spring 18 is undergoing compression, and a relatively slow opposite movement of the rod 12 when the spring 18 is extending in the act of applying the brakes. 19 is a gland at the inner end of the dash pot cylinder 15. The brake spring 18 is housed within the cylinder E and it surrounds the dash pot; it takes abutment against the cylinder cover 14 at one end of it, and its outer end bears against the back of the piston 10. Externally of the outer stuffing box 13 the rod 12 is forged to rectangular shape as indicated at 20. The top face of the rectangular portion 20 works in contact with an anti-friction guide roller 21 which is carried on an adjusting arm 22; adjustment of this arm is effected by means of nuts 23 running on a stud 24 which is tapped into a bridge 25. This bridge and the arm 22 are pivotally mounted at 26 on overhanging jaws 27 which extend backward from the cylinder cover 14. 28 is a tappet on one side of the rod 12; this tappet engages a forked lever 29 (Fig. 4) which is fitted on the stem 30 of the cock Q, and this cock is connected by the pipe P to the auxiliary reservoir C on the one side of it and by a pipe V on the other side of it to the cylinder 31 in the automatic valve O. The lower side of the rectangular part 20 of the rod 12 is planed and runs over the flat face of the latch 32; this latch is rockable in bearings formed for it in the jaws 27. It is carried by a lever arm 33 and it is engageable with a check 34 on the rod 12 when the spring 18 is compressed to the full extent and the rod 12 is brought to the full out position. The lever arm 33 is connected by a link 35 on the outer end of a piston rod 36. This piston rod is carried in a guide 37 on the front end of the latch cylinder 38. The latch operating piston 39 which is fixed on the inner end of the rod 36 is subject to pressure acting in the cylinder 38, and is reversely subject to pressure of the spring 40 which moves it reversely when the air pressure fails. 41 is an adjusting collar which is carried on the tubular portion of the guide 37. By means of this collar 41 the tension on the reversing spring 40 can be adjusted.

The automatic valve O consists of a casing 42 varying in diameter and divided by a diaphragm 43 through which the piston rod 44 works. The joint is packed to prevent leakage of pressure therethrough. The smaller chamber 45 is fitted with a valve seating 46 at one end of it into which the pipe U is connected. A port 47 in the side of it is connected by the high pressure charging pipe N to the train pipe A. The cylinder chamber 31 is fitted with a piston 48 and the tail rod 49 of the piston rod 44 is extended out through a stuffing box 50 in the back end of the valve casing and is fitted with an adjusting nut 51. A spring 52 acting behind this adjusting nut and taking an abutment against the back of the yoke 53 operates to force the rod 44 forwardly, thus to close the valve 54 on the ring seat 46 and to move the piston 48 towards the diaphragm 43 when the pressure falls. A port 55 through the side of the cylinder 31 just rearward of the diaphragm 43 is connected by the pipe V to the auxiliary air reservoir C through the valve Q. 56 is a ring seating on the face of the chamber 57 in the back end of the cylinder 31. A ring face 58 on the back of the piston 48, in diameter about half the piston diameter, coacts with this ring seating 56 to close the chamber 57; that chamber is connected by the air release pipe T to the back end of the accessory brake cylinder E. 59 is a port to atmosphere through the side of the cylinder casing 42; this port is positioned so as to be always behind the piston 48 and not overrun by it.

When there is normal pressure in the train pipe A, air at that pressure passes by the pipe N to the chamber 45 in the valve casing O and thence through the ring seat 46 and the connector pipe U to the back end of the accessory brake cylinder E, and forces the piston 10 forwardly therein, compressing the accessory brake spring 18 and forcing out the brake operating rod 12. At the same time, air from the auxiliary air reservoir C passes through the pipe R to the latch cylinder 38 and forces the piston 39 and the piston rod 36 outwards, compressing the retiring spring 40, and tilting the latch 32 to cause it to engage behind the check 34 on the brake rod. The tappet 28 striking the fork 29 in this outward movement closes the valve Q. If, therefore, air supply is restored whilst the accessory brake is applied, air is not lost and the auxiliary air reservoir will be charged up to the normal pressure. So long as the auxiliary brake air is maintained at normal pressure in the reservoir C, the latch 32 is held at the engaged position which is shown in Fig. 2, because the latch piston 39 is held at the out position by the air pressure; consequently the spring 18 is held and cannot extend to pull on the brake rod 12 so long as the auxiliary air pressure is sufficient for normal operation of the standard brake equipment.

Air from the auxiliary brake reservoir C also acts on the forward side of the control piston 48 for some time after the spring 18 is thus set and latched; it holds the piston 48 at the in position and keeps the valve 54 open. When the pressure drops substantially in the control cylinder 31, the valve Q being closed, the spring 52 forces the piston rod 44 forward, closing the valve 54 and thus isolating the cylinder E from the train pipe and simultaneously opening the back end of the cylinder E to atmosphere through the air port 59 in the side of the cylinder casing 42, and reopening the cock Q. The pipes P—V connect the control cylinder 31 with the auxiliary air reservoir C (through the valve Q), and the pipe T connects the back end of the brake cylinder E with the chamber 57 behind the piston 48 in the back end of the cylinder 42 of the automatic valve O. The port 59 in the side of the control cylinder 31 allows air to escape from the back end of the brake cylinder E through the pipe T when the valve 58 on the back of the piston 48 is off the seat 56.

So long as normal air pressure is maintained in the auxiliary air reservoir C the latch control piston 39 is forced forward, compressing the spring 40, the valve 58 is held closed, the valve 54 is held open, and the latch 32 is held engaged with the check 34 in the rod 12. This is the position at the moment at which the brake spring 18 is brought to the closed position shown in Fig. 2. The closing of the latch 32 is simultaneous with the closing of the valve Q through which the auxiliary reservoir C is connected to the cylinder 31 of the automatic valve O through the pipes P and V. When the valve Q is closed, pressure is lost gradually from the cylinder 31 and when the pressure drops to a low point the spring 52 acts to shut the valve 54 and to open the back end of the cylinder E to atmosphere through the pipe T and the port 59. Upon failure of pressure in the auxiliary air reservoir C, the piston 39 is no longer held against the spring 40, which then forces it back; back movement of the piston rod 36 then releases the latch 32. The brake spring 18, being thus freed, extends, and pulls the rod 12 operating the standard brake rigging D to apply the brakes. The speed of the movement is checked by the air dash pot cylinder 15 which is housed within the spring 18; the check valves 17 in the piston 16 of the dash pot are fixed to control the extension of the spring 18 at a predetermined rate. The dash pot permits rapid closing movement of the spring 18 in the resetting action.

Failure in the air system of the standard brake thus results in immediate automatic application of the accessory spring brake, so that the vehicle is brought to rest and held. Upon restoration of the air service to normal, air from the auxiliary air reservoir acts to reset the latch 32, and also acts to force the piston 48 back, thus closing the valve 58 to temporarily imprison air in the cylinder E, and opening the valve 54 to admit train pipe pressure through the connector pipe N, valve seat 46, and pipe U to the cylinder E to force the piston 10 forwardly and compress the spring 18 and release the brakes.

When a vehicle fitted with this accessory brake is detached from the train so that air supply cannot be then replenished in its auxiliary air reservoir, the accessory brake will come into operation when the pressure in that reservoir drops to a predetermined low point, and the brakes will be held. In order to permit movement of the vehicle whilst it is so detached from the train, it is necessary to provide a manual pull-off for the automatic brake. This is accomplished by the chain drum K which is rotatable by a hand crank 61 to swing the lever H by pulling on the chain, thus to pull off the brakes. Upon release of the drum by knocking out a pawl latch, the accessory brake is automatically reapplied.

What I claim as my invention and desire to secure by Letters Patent is:—

1. The combination with a pressure air railway brake system including an auxiliary air reservoir, of a spring adapted for applying and holding the brakes, means dependent upon maintenance of working pressure in the auxiliary air reservoir for retiring said spring and latching it against operation, and means dependent upon drop of pressure in the auxiliary air reservoir for releasing said latching means to permit said spring to operate the brakes.

2. The combination with pressure air railway brake apparatus, of auxiliary means for applying and holding the brakes when the pressure in the auxiliary air reservoir fails, said means comprising a brake application spring, a piston movable in a cylinder and arranged to tension that spring when train pipe pressure is applied to it, a brake operating rod connecting said spring to the brake linkage, a cylinder pipe connected to the auxiliary air reservoir and fitted with a piston, a retiring spring fitted in front of said piston, a piston rod fixed to said piston and operatively connected to a latch to engage the latch with the brake operating rod only whilst normal pressure is maintained in the auxiliary air reservoir, and an automatic valve controlled by variations in pressure in the auxiliary air reservoir and adapted for admitting air under train pipe pressure to said first mentioned cylinder to retire the spring therein when the auxiliary reservoir carries normal pressure and upon loss of normal pressure in the auxiliary reservoir to close the connection from the train pipe and to open said first mentioned cylinder to atmosphere to permit the brake application spring to function.

3. Auxiliary braking means for railway vehicles which are fitted with pressure air brake apparatus having an auxiliary air reservoir, said means comprising a cylinder, a helical spring in said cylinder behind a piston therein, said spring proportioned to store sufficient energy to apply and hold the brakes, said piston proportioned to tension said spring when it is subjected to train pipe pressure, a piston rod extending through one end of the cylinder, a connection from said piston rod to the brake rigging, a latch engageable with the piston rod or with said connection and adapted for holding the piston at full out-stroke position and the spring tensioned, spring retired operating means associated with said latch adapted for causing its engagement when the air pressure in the auxiliary reservoir is normal, and a spring loaded balanced valve operated obediently to variations in air pressure in the auxiliary reservoir, said valve controlling connections from the first mentioned cylinder to train pipe and to atmosphere respectively.

4. In combination with auxiliary brake apparatus according to claim 3, an air dash pot enclosed within the brake spring and arranged to buffer the recoil of the spring substantially as described.

5. In auxiliary brake apparatus according to claim 2, automatic control means comprising a casing containing a cylinder, a piston in said cylinder, a piston rod extending into a chamber which is connected to the train pipe, said rod carrying a valve co-acting with a valve seat in said chamber to control the connection between the auxiliary brake cylinder and the train pipe, a valve in the control valve cylinder arranged for connecting the auxiliary brake cylinder to atmosphere, a pipe connection to one end of the control cylinder from the auxiliary air reservoir for admitting air to move the piston in said cylinder outward to close the atmospheric port and to open the train pipe port, and a spring acting on said piston to move it oppositely to the auxiliary air pressure to open the atmospheric air port and to close the train pipe port when auxiliary air pressure fails.

6. Locking means for pressure air brakes according to claim 1, comprising a latch engageable with a rod which connects the brake spring piston to the brake rigging, a piston rod operatively connected to the latch, a spring retired piston carried by said rod, said piston working in a cylinder which carries auxiliary reservoir air pressure, and an adjustable slide abutment adapted for supporting said connecting rod against lateral displacement by the latch.

In testimony whereof I affix my signature.

ROY GRATTAN COWLISHAW.